United States Patent [19]

Landau et al.

[11] 4,192,425
[45] Mar. 11, 1980

[54] TELEPHONE ACCESSORY

[76] Inventors: Paul H. Landau; Harolyn S. Landau, both of 8632 W. Olympic Blvd., Los Angeles, Calif. 90035

[21] Appl. No.: 867,051

[22] Filed: Jan. 4, 1978

[51] Int. Cl.² .................... B42F 13/00; A47F 7/00
[52] U.S. Cl. ............................. 211/50; 40/404; 179/146 R; 179/178; 211/69.1; 211/86
[58] Field of Search .............. 211/86, 11, 51, 50, 211/49 R, 69.1; 206/425; 179/146 R, 147, 178; 248/441 B, 441 C, 222.2; 40/336, 403, 404, 400; 312/183

[56] References Cited

U.S. PATENT DOCUMENTS

| 514,921 | 2/1894 | France | 211/51 |
| 672,530 | 4/1901 | Hunter | 211/51 |
| 1,983,443 | 12/1934 | Duceska et al. | 248/441 C X |
| 2,620,407 | 12/1952 | Nagy | 179/178 |
| 2,626,479 | 1/1953 | Marrits | 211/50 X |
| 2,693,509 | 11/1954 | Selee | 179/146 R |
| 3,817,393 | 6/1974 | Neilsen | 211/50 |

FOREIGN PATENT DOCUMENTS

| 157674 | 1/1953 | Australia | 211/51 |
| 1031012 | 6/1953 | France | 40/336 |

*Primary Examiner*—William E. Lyddane
*Attorney, Agent, or Firm*—Roger A. Marrs

[57] ABSTRACT

An accessory device detachably mountable on a telephone unit is disclosed herein suitable for supporting a writing pad and a writing implement. The device includes a support piece or base having an attachment portion detachably connectable with the well and cradle portions of a conventional telephone and having a support portion cantilevered outwardly therefrom incorporating a writing pen and pad well. A display area is defined on the mounting portion for carrying advertising message or the like. A holder for a card file is detachably carried on the support portion with the writing pad well. A retainer plate is adjustably carried by the holder for retaining a plurality of index cards or the like on parallel runners in cooperation with a snap-lock release device. The latter device releasably secured the holder to the support portion.

4 Claims, 10 Drawing Figures

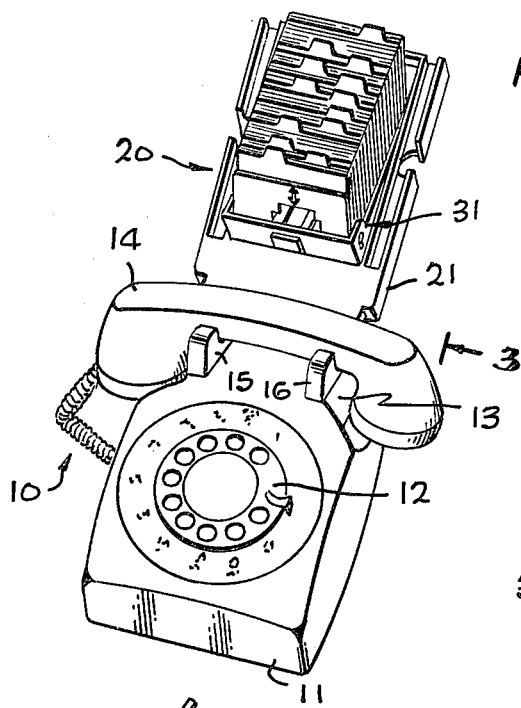
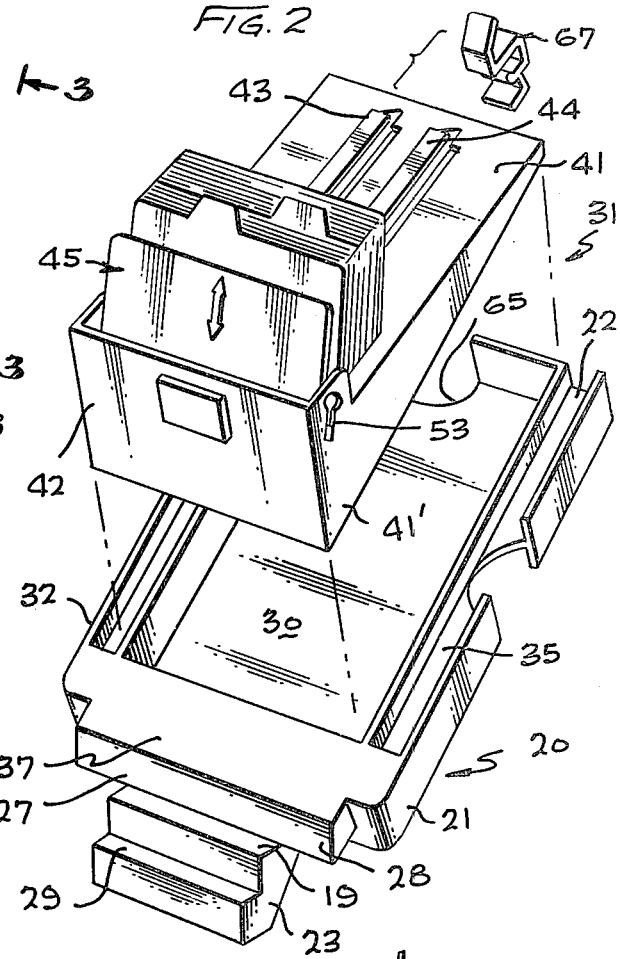
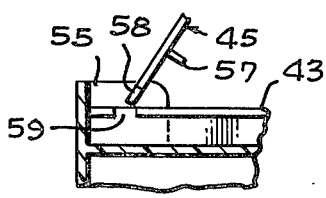
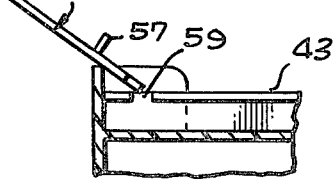
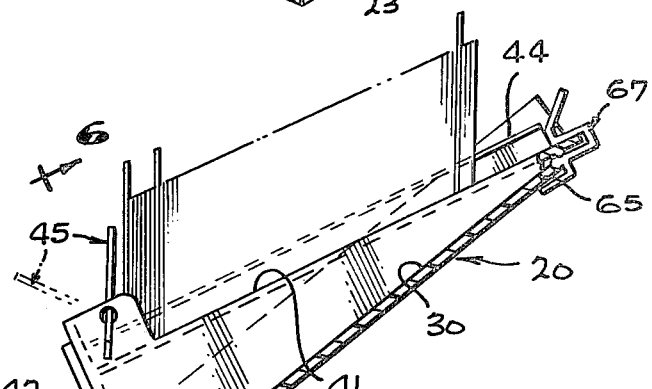
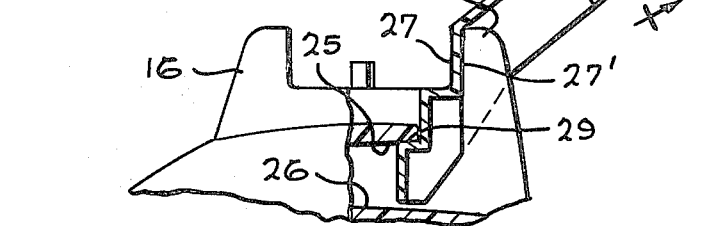

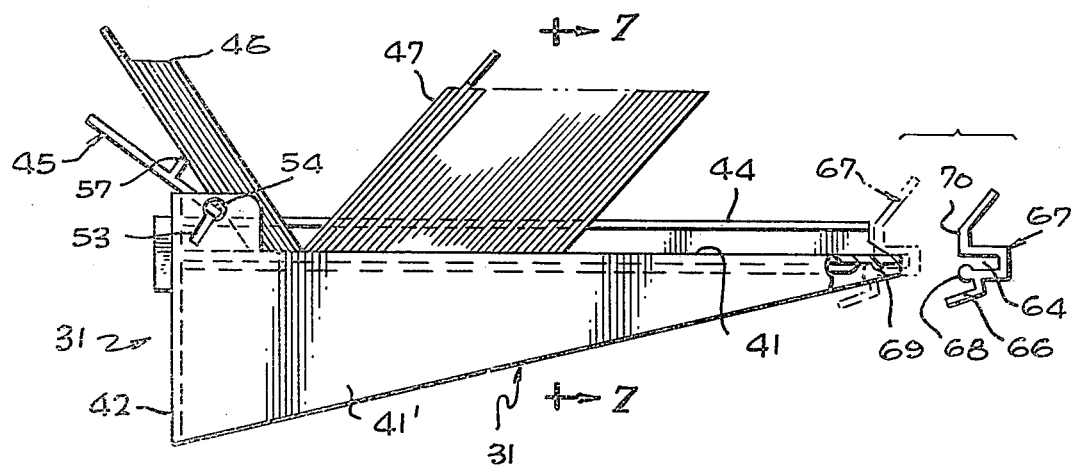
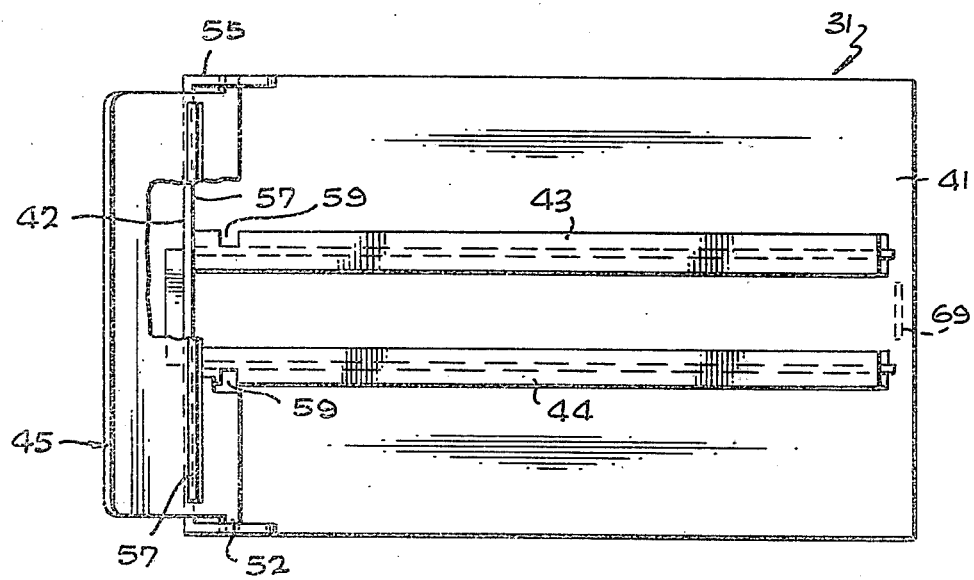
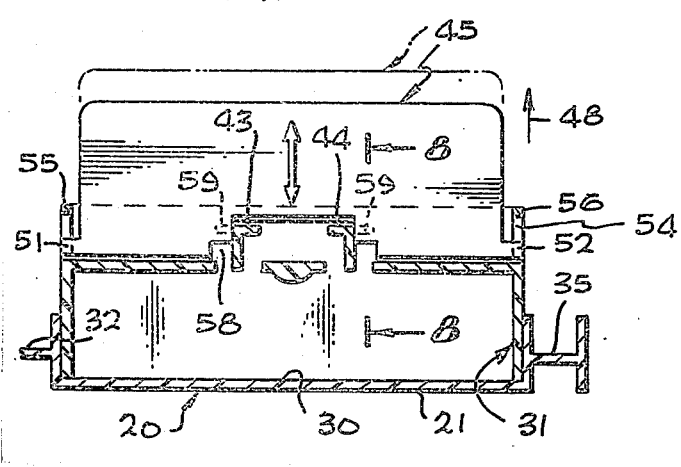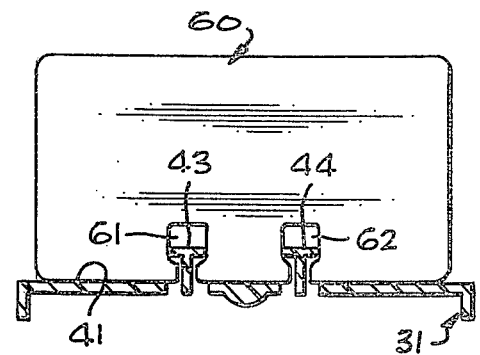

TELEPHONE ACCESSORY

BACKGROUND OF THE INVENTION

1. Field of the Invention

This invention relates to telephone accessories and, more particularly, to a novel accessory for supporting a writing pad, a writing implement and/or a card holder in a convenient location on a telephone.

2. Description of the Prior Art

A telephone is a convenient instrument of communication and it is the normal practice to provide a telephone instrument having a finger dial mounted on a face and a removable handpiece which is carried on a cradle immediately above the dial. During a conversation by the telephone user, it is often necessary that certain information be written on a pad, or at least visually located in a card or index file. Since the user's mobility is restricted by the length of the cord connecting the handpiece to the telephone, card files, writing implements and writing paper are difficult to locate and use. Accessory units for telephones have been developed which will provide writing pads and writing implements for the convenience of the user.

However, difficulties have been encountered since mounting of card files and pad supports cannot normally be conveniently accomodated on the standard telephone instrument. The standard units or instruments are generally smooth in finish and do not provide a wide variety of projections, mounts or other suitable supporting elements to which accessory items can be attached. In the past, some telephone accessories have taken advantage of a well which is formed beneath the handpiece cradle in order to properly support the accessory. Generally, these prior accessory mountings for mating with the telephone well are complex, cumbersome to install and fail to give proper support to the plurality of cards or writing pads intended to be supported. Also, conventional accessory mounts and holders are not adjustable and sometimes include projections and other elements which interfere with the normal operation of the telephone.

Therefore, it is highly desirable to provide a telephone accessory for supporting writing or note pads, pens, pencils or card or index files in such a manner that the implements or cards are properly supported not only for storage but for actual use, and which include attachment means that are compatible with the standard configuration of the telephone.

SUMMARY OF THE INVENTION

Accordingly, the problems and difficulties described above are obviated by the present invention which provides a supporting base having an attachment portion which projects into the well of the telephone immediately below the cradle and which further includes a pair of integral steps or projections intended to engage with the cradle portion of the telephone unit. The attachment portion is integrally formed with an accessory support portion included in the support base that provides grooved receptacles or well areas for storing or holding a variety of writing implements and/or a card or index file. In one version of the invention, a well area having a flat surface is provided between writing implement storage receptacles for accommodating the mounting of a writing pad or card file holder. The card file hodler includes a plurality of cards slidably carried on parallel runners and further includes releasable means for detachably coupling the holder to the support portion. Adjustable means provide a retainer for permitting limited pivotal movement of the cards on the runner.

Therefore, it is among the primary objects of the present invention to provide a novel telephone accessory adapted to support a variety of writing accessories and implements that may be detachably carried on existing structure of a conventional telephone unit.

Another object of the present invention is to provide a novel telephone accessory for supporting writing implements and card files that may be adjusted to a variety of standard telephone units.

Another object of the present invention is to provide a novel accessory for a telephone that is readily insertable into the well of a conventional telephone unit and which includes a stepped projection engageable with the cradle of the telephone for supporting the accessory in a cantilevered fashion from the rear side of the unit.

A further object of the present invention is to provide a novel accessory for a telephone that is economical to manufacture, easy to assemble and disassemble from a telephone instrument, and that does not require tools or skill on behalf of the installer.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of one version of the novel telephone accessory device of the present invention for mounting on a conventional telephone unit or instrument;

FIG. 2 is an enlarged perspective view of the novel telephone accessory device shown in FIG. 1.

FIG. 3 is an enlarged fragmentary side elevational view of the telephone accessory device of the present invention illustrating the stepped projection;

FIG. 4 is a side elevational view of the card file detachably carried on the support portion;

FIG. 5 is a top plan view of the card file shown in FIG. 4;

FIG. 6 is a front elevational view thereof showing the adjustable retention plate;

FIG. 7 is a transverse sectional view of the card holder as taken in the direction of arrows 7—7 of FIG. 4; and FIG. 8–10 inclusive are fragmentary views illustrating the adjustable plate positions during an adjustment sequence.

DESCRIPTION OF THE PREFERRED EMBODIMENT

Referring to FIGS. 1 and 3, a conventional telephone is illustrated in the general direction of arrow 10 which includes a housing 11 for supporting a rotary dial 12 and a cradle 13 carried above the dial. The cradle 13 is employed for removably supporting a handpiece 14 between a pair of forward elements 15 and 16 and a pair of rear elements 17 identical in construction. The forward and rear pair of handpiece support elements are integrally formed with the cradle 13 and are arranged in fixed spaced relationship so as to accommodate the width of the handpiece 14.

The telephone accessory device of the present invention is illustrated in the general direction of arrow 20 in FIGS. 1 and 2 and includes a base 21 having a writing pad, a writing implement or accessory support portion 22 and an attachment portion 23. The writing or accessory portion 22 and the attachment portion 23 are integral so that the base 21 comprises a one-piece unitary structure. The attachment portion 23 is stepped by providing shoulders 19 and 29 and mounts immediately behind the cradle 13 of the telephone and cantilevers to the rear thereof at an upwardly sloping angle. This relationship is more clearly shown in FIG. 3 wherein the attachment portion 23 is insertably received in the well of the telephone housing defined by opposing surfaces 25 and 26. The shoulder 29 abuts against a portion of the cradle at its underside while shoulder or step 19 resides on the top of the cradle in the space defined between the front and rear pairs of handpiece support elements 15–17. Lateral extensions 27 and 28 are hollow so that the rear elements 17 of the cradle fit immediately therebehind.

As shown in FIG. 2, the accessory base 22 includes a supporting surface 30 for holding a pad of paper or a card file 31. Located along the opposite sides of the supporting surface, there is provided a plurality of writing implement holders identified by numerals 32 and 35. These holders define receptacles which are elongated and generally run parallel to the longitudinal axis of the device. The receptacles are arranged in pairs on each side of the device and are separated by a space betweeen adjacent pairs so as to permit the user's fingers to firmly grasp the writing implement during use for insertion into the receptacle or removal therefrom. The pad or card file 31 is disposed on the support area 30 between receptacles 32 and 35. Additionally, a display surface 37 is included which defines an area for the placement of advertising subject matter. It can be seen that the receptacles are of sufficient depth to support writing implements whereby the implements may be stored out of the way of the user to prevent inadvertent dislodgment from the receptacles.

In FIG. 3 it can be seen that the rear handpiece support elements 17 are nested behind the lateral extensions 27 and 28 while the step or shoulder 29 abuts against the underside of the well. Therefore, the present invention is cantilevered upwardly and rearwardly of the telephone base in releasable or detachable relationship. The attachment portion 23 is hollow and the step configuration of the various shoulders are exposed interiorly of the attachment portion as well as exteriorly. Step 29 abuts on the underside of the telephone well against surface 25 and step 19 is coextensive with the standard or conventional portion of the telephone cradle on which the handpiece 14 rests. The corresponding internal steps within the hollow of attachment portion 23 bear against the upright elements 17 as indicated by numeral 27' immediately behind the external step 27'.

Referring to FIGS. 1 and 2, it can be seen that the card holder 31 includes a box-like structure which includes a sloping ramp or supporting surface 41 which terminates at its front end by a U-shaped front wall 42. Immediately behind the front wall 42, there is provided a plurality of index cards such as may be used for displaying addresses, telephone numbers, names and alphabetical dividers. The cards are slidably and detachably carried on a pair of parallel sliders or runners 43 and 44 which are of a general T-shape in cross section so as to hold mating apertures in the bottom of each of the cards and alphabetical dividers.

It is to be particularly noted that the front of the stack or plurality of cards is held by a pivotal plate indicated by numeral 45 and the plate is shown in FIG. 3 in its upright position in solid lines whereby the stack of cards are held in a ready position for use. In broken lines, the plate 45 is shown pivoted to a substantially horizontal position in which event, the plurality of cards are permitted to fall or pivot horizontally until such card as is desired may be located. The desired card is then maintained in the upright or vertical position while in use and the full display of information contained on the card is visually available to the user. The condition just described is shown more clearly in FIG. 4, wherein the front plate or retainer plate 45 is illustrated in its lowered position and the stack of cards indicated collectively by numeral 46 are lowered and maintained out of the way so that a particular card, identified by numeral 47, is available to the view of the user. It can be seen that the plurality or stack of cards are loosely carried on the runners 43 and 44 so that they may be readily pivoted between the upright and lowered positions by the pivoting of the retainer plate 45.

As seen in FIGS. 8–10 inclusive, the plate 45 is pivoted by moving the plate upward in the direction of arrow 48 as shown in FIG. 8, to the position shown in FIG. 9. At this time, the plate 45 may be pivoted in the direction of arrow 50 to its lowered position.

As seen more clearly in FIG. 4, in combination with FIGS. 5 and 6, the retaining plate 45 includes outwardly extending ears 51 and 52 on opposite sides along the bottom thereof which are loosely fitted in an elongated slot 53 which terminates at its upper end in a round aperture or hole 54. Therefore, when the retainer plate 45 is lifted as shown in FIG. 8, the lateral ears traverse upwardly through the slot 53 into the hole 54, and when the plate 45 is rotated forwardly as shown in FIG. 10, the ears 51 and 52 rotate within the apertures 54. The slot 53 and aperture 54 are provided in sidewalls 55 and 56 integrally formed with the frontwall 42 and are separated by the width of the plate 45 as well as the width of the stack of cards. As shown in FIGS. 4 and 5, the rear side of the retaining plate 45 includes an elongated bar 57 which supports the stack of cards 46 when the retainer plate 45 is in its lower position. The lower midsection of the retainer plate 45 includes a shaped opening indicated in general by numeral 58 which accomodates the sliding or passing over of the plate with respect to the runners 43 and 44. It can also be seen in FIG. 6 that the card holder fits snugly within the well defined between writing implement holders 32 and 35 on the supporting surface 30.

As shown in FIG. 7, a card 60 is placed on the rails or runners 43 and 44 by means of inserting the T-shaped rails of the sliders into apertures 61 and 72 provided on the card. The apertures include a restricted entrance leading thereto from the bottom edge of thecard which may be forced or forcibly urged over the rail of the runners to effect a loose attachment therewith.

In FIGS. 3 and 4, means are provided for not only detachably connecting the file card or index card holder onto the support portion of the telephone accessory 21, but cooperates to maintain the stack or plurality of cards on the respective runners or sliders 43 and 44. Without such a means, the cards would readily fall off the back end of the rails and the holder would not be firmly supported or attached to the underlying support portion 21. In the present instance, the means takes the form of a snap-lock fastner which is resilient and includes a receptacle identified by numeral 64 which receives the rear-most edge marginal regions of the holder 41 and the support portion 21. The support portion 21 includes a semicircular recess identified in FIG. 2 by numeral 65 which is captured by a second receptacle 66. The captured end marginal portion of the support attachment 21 is shown in FIG. 3 as well as captured edge marginal region portion of the card holder 41. In order to secure the latch or fastening means 67 which defines the pair of receptacles, a knob or lobe 68 is provided between the pair of receptacles which snap-locks over a protruding lip 69 carried on the underside of the card holder 41. When the latch or lock means 67 has been so snapped into position over the rear edge marginal regions of the card holder 41 and the support base 21, an upright portion identified by numeral 70 serves to interfere or block the removal of cards from the runners or slides 43 and 44. The upright portion 70 is in close proximity to the terminating ends of the runners or slides so that the cards cannot pass without the removal of the clip means 67.

In view of the foregoing, it can be seen that the device of the present invention provides a novel accessory for a telephone which may readily support writing implements, a writing pad or a card file. When the card file is employed, a novel means is provided for readily exposing the contents of a selected card to the eye of the viewer without interference from other cards in the stack or plurality. Such means includes the retention plate 45 and its movable mounting on the opposite sidewalls 55 and 56 by means of the lateral ears 51 and 52. Furthermore, by means of the snap-lock or clip retainer 67, not only are the plurality of cards held in position on the skids or runners 43 and 44 but the card file is detachably connected to the support base or attachment portion 21.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An accessory box for a telephone having
housing and a cradle for supporting a handpiece and which is formed with a well cavity to the rear of the cradle, the combination comprising:
a support base portion;
an attachment portion carried by said base portion for insertion into the well cavity for cantilevering said base portion rearwardly and at an upwardly sloping angle;
means releasably coupling with the cradle for supporting said base in the well cavity in cooperation with said attachment portion so as to cantilever rearwardly from the cradle at an angle thereto;
accessory means carried on said base portion;
said attachment portion includes a pair of steps defining a first external shoulder insertably received within the well cavity and a second external shoulder engaging a part of the cradle and,
a pair of hollow side projections outwardly carried from opposite sides of said attachment portion adapted to receive and cover a portion of the cradle;
said attachment portion first shoulder constitutes a foot insertably engageable with the underside of said cradle within the well cavity;
said base portion includes a display area for carrying indicia;
a plurality of holders constituting writing implement support means carried on opposite sides of said base portion in fixed spaced relationship so as to define an accessory supporting area therebetween.

2. An accessory for a telephone having a
housing and a cradle for supporting a handpiece and which is formed with a well cavity to the rear of the cradle, the combination comprising:
a support base portion;
an attachment portion carried by said base portion for insertion into the well cavity for cantilevering said base portion rearwardly and at an upwardly sloping angle;
means releasably coupling with the cradle for supporting said base in the well cavity in cooperation with said attachment portion;
accessory means carried on said base portion;
said attachment portion includes a pair of steps defining a first external shoulder insertably received within the well cavity and a second external shoulder engaging a part of the cradle;
said attachment portion further includes a pair of hollow side projections outwardly carried from opposite sides of said attachment portion adapted to receive and cover a portion of the cradle;
said accessory means is a card file holder detachably carried on said support base portion;
snap lock means releasably coupling said holder to said base portion;
said holder further includes a plurality of display cards slidably carried on a pair of parallel rails; and
a retainer plate operable between a first and a second position to hold said cards so that a selected display card is plainly visual without interference from the remainder of said plurality of cards;
said retainer plate includes a pair of outwardly projecting lateral ears slidably and pivotally carried on opposite sidewalls of said holder; and
said opposite sidewalls include an elongated substantially vertically oriented slot terminated at its upper end in a rounded aperture wherein said retainer plate ears are slidably related to said slot and pivotally related to said aperture.

3. The invention as defined in claim 2
wherein said snap-in lock means includes a resilient clip having a pair of receptacles for insertably receiving the rear edge margin thicknesses of said support base portion and said holder; and
an upright portion adapted to retain said plurality of cards on said rails.

4. The invention as defined in claim 3 wherein:
said snap-lock means further includes a lobe carried between said pair of receptacles forcibly engagable with a ridge downwardly dependable from the underside of said holder so as to detachably retain said holder onto said support base portion.

* * * * *